(12) United States Patent
Schaff et al.

(10) Patent No.: US 8,251,432 B2
(45) Date of Patent: Aug. 28, 2012

(54) GLASS SEAL

(75) Inventors: Alexander Schaff, Leipzig (DE);
Steffen Gruber, Rehau (DE); Udo Kaiser, Bochum (DE)

(73) Assignee: Rehau AG + Co, Rehau (DE)

( * ) Notice: Subject to any disclaimer, the term of this patent is extended or adjusted under 35 U.S.C. 154(b) by 0 days.

(21) Appl. No.: 13/121,684

(22) PCT Filed: Mar. 7, 2009

(86) PCT No.: PCT/EP2009/001656
§ 371 (c)(1),
(2), (4) Date: Mar. 30, 2011

(87) PCT Pub. No.: WO2010/037432
PCT Pub. Date: Apr. 8, 2010

(65) Prior Publication Data
US 2011/0181071 A1    Jul. 28, 2011

(30) Foreign Application Priority Data
Oct. 2, 2008  (DE) .................... 20 2008 013 133 U

(51) Int. Cl.
*B60J 10/02* (2006.01)
(52) U.S. Cl. .......................... 296/93; 49/475.1
(58) Field of Classification Search ............... 296/84.1, 296/93; 49/475.1; 277/921
See application file for complete search history.

(56) References Cited

U.S. PATENT DOCUMENTS

| | | | | |
|---|---|---|---|---|
| 4,119,325 A | * | 10/1978 | Oakley et al. | 277/642 |
| 4,614,347 A | * | 9/1986 | Kruschwitz | 277/641 |
| 4,888,929 A | * | 12/1989 | Vaughan et al. | 52/204.597 |
| 5,010,689 A | * | 4/1991 | Vaughan | 49/440 |
| 5,255,472 A | * | 10/1993 | Larsen et al. | 49/490.1 |
| 5,343,609 A | * | 9/1994 | McManus | 29/451 |
| 5,451,090 A | * | 9/1995 | Brodie et al. | 296/192 |
| 5,618,593 A | * | 4/1997 | Belser et al. | 428/31 |
| 6,478,308 B1 | * | 11/2002 | McMillin et al. | 277/630 |
| 6,847,651 B1 | * | 1/2005 | Westerberg | 370/437 |
| 6,942,225 B2 | * | 9/2005 | Gentemann et al. | 277/641 |
| 6,962,350 B2 | * | 11/2005 | Berry et al. | 277/628 |

FOREIGN PATENT DOCUMENTS

DE    36 12 923    10/1987
(Continued)

OTHER PUBLICATIONS

International Search Report.

*Primary Examiner* — Lori Lyjak
(74) *Attorney, Agent, or Firm* — Da Vinci Partners LLC

(57) ABSTRACT

The present invention relates to a glass seal for attaching an attached part (2) to a glass pane (3) of a motor vehicle, having a mounting profile (1) comprising a mounting arm (4) contacting the surface (5) of the glass pane (3), and a latching profile (7) for receiving an attachment element (8) of the attached part (2), characterized in that the mounting profile is designed such that a lower force is required for assembling the attached part (2) than for removing the same. The invention further relates to an arrangement of a glass seal according to the invention having a glass pane (3) of a motor vehicle, an attached part (2), or a water tank cover (2).

19 Claims, 6 Drawing Sheets

FOREIGN PATENT DOCUMENTS

Figure 1:
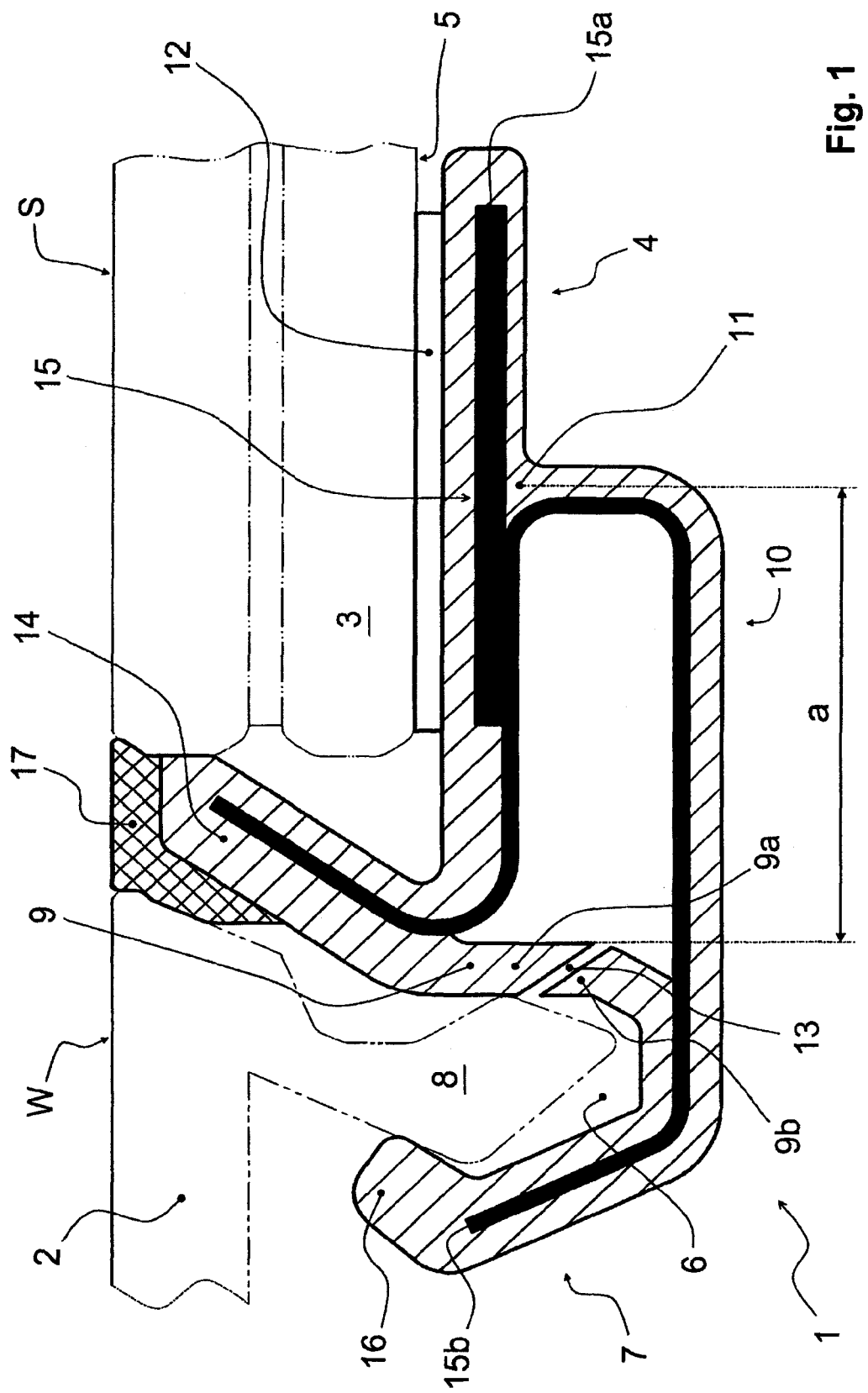

| | | | |
|---|---|---|---|
| DE | 36 12 923 A1 | * | 10/1987 |
| DE | 10 2004 044 598 A1 | | 3/2006 |
| DE | 20 2008 006 986 U1 | | 11/2009 |
| EP | 0 249 560 | | 12/1987 |
| EP | 0 249 560 A | * | 12/1987 |
| EP | 0 304 694 | | 3/1989 |
| EP | 0 304 694 A | * | 3/1989 |
| EP | 1 280 675 B | * | 2/2003 |
| WO | WO01/85481 | | 11/2001 |

* cited by examiner

GLASS SEAL

CROSS REFERENCE TO RELATED APPLICATIONS

This application is the National Stage of International Application No. PCT/EP2009/001656, filed Mar. 7, 2009, which claims benefit under 35 USC §119(a), to German patent application Ser. No. 20 2008 013 133.2, filed Oct. 2, 2008.

STATEMENT REGARDING FEDERALLY SPONSORED RESEARCH OR DEVELOPMENT

Not applicable.

BACKGROUND OF THE INVENTION

The present invention relates to a window pane seal for connection of an add-on part to a window pane of a motor vehicle, having a retaining profile comprising a retaining arm which rests in contact with the surface of the window pane and a latching profile for receiving an attachment element of the add-on part.

A window pane seal with the features described in the introduction is disclosed in DE 10 2004 044 598 A1. The retaining profile has an undercut for receiving a projection or a pawl of a water collecting channel cover. A reinforcing core is also provided. Notches, the form of which enables the required assembly and removal force to be adjusted, are provided in the curvature of the core. In doing so however, the assembly force and the removal force cannot by design be defined independently of one another, but only jointly.

A profile body which is provided with stiffening inserts and which has a recess for receiving a spring-engaging rib of a water collecting channel cover is disclosed in EP 1 280 675 B1. The profile body is provided with an elastic supporting arm which ends substantially flush with the outer surfaces of the bottom edge of the window pane and the top edge of the water collecting channel cover. The sealing profile rests in contact with the windshield from behind with a self-adhesive bonding layer. The profile body must be supported at the rear against the acting assembly force on a part of the vehicle body by means of a buffer strip. If a high removal force is to be achieved, correspondingly high assembly forces must be used, which make supporting the profile body on part of the vehicle body absolutely essential. Without support, the bonding layer is unable to accommodate the assembly forces which occur, as the profile body would come away from the windshield when fitting the water collecting channel cover. A low assembly force cannot be achieved while at the same time maintaining a high removal force.

What is needed therefore is such a profile body wherein low assembly force can be achieved while at the same time maintaining a high removal force.

SUMMARY OF THE INVENTION

Against this background, the invention is based on the object of specifying a window pane seal with the features described in the introduction which enables an add-on part to be easily fitted while at the same time achieving a high retaining force.

According to the invention, this object is achieved in that the retaining profile is designed in such a way that a smaller force is required to fit the add-on part into place than to remove it. A small force required for assembly guarantees that the add-on part, preferably a water collecting channel cover of a motor vehicle, can be fitted easily, cost effectively and quickly. As a result of the greater force necessary for removing the add-on part, a high retaining force of the add-on part is simultaneously guaranteed.

The latching profile can preferably have at least two profile arms which together form an undercut clamping channel. Advantageously, the first profile arm which faces the retaining arm can have a discontinuity which divides the first profile arm into two sub-regions. In addition, it is possible to provide a bonding element which bonds the latching profile to a bonding region of the retaining arm which is at a distance from the first profile arm. When the add-on part is fit, the distance between the sub-regions therefore increases, while the sub-regions come closer together when the add-on part is removed. The latching profile transmits the assembly forces to the bonding element. The bonding element acts as a latching lever arm and the assembly forces are reduced. Advantageously, the length of the bonding element and thereby the assembly force can be adjusted by design over a wide range by varying the distance between the latching profile arm and the bonding region. In contrast, the removal force increases when the add-on part is removed, for example as soon as the sub-regions come into contact with one another. The latching lever arm of the bonding element becomes shorter and is not at all effective. The assembly and removal forces can be adjusted easily and variably over a wide range completely independently from one another. Advantageously, the geometry of the clamping channel is formed in such a way that the deflection of the latching profile, which is enabled by the discontinuity in the profile arm, reduces the undercut region of the clamping channel, and the attachment element can engage behind the latching profile with less force.

The retaining arm of the window pane seal can have an adhesive tape bordering the surface of the window pane or a layer of adhesive bordering the surface of the window pane. The retaining arm of the retaining profile can be quickly and easily bonded to the surface of the window pane by means of the adhesive tape. A layer of silicone or any other suitable joining method can also be provided for bonding the retaining profile to the window pane of the motor vehicle. Because of the low assembly forces, a body-shell-side supporting of the window pane seal at the rear on the motor vehicle body as described in EP 1 280 675 B1 is unnecessary. The expensive and elaborate sealing of the retaining profile with an adhesive, for example, can likewise be dispensed with. The window pane seal according to the invention enables this additional outlay to be avoided resulting in less design effort, greater design freedom and a reduction in costs and assembly times.

The bonding element of the window pane seal can attach to the bonding region substantially at right angles. The assembly forces which are transmitted via the latching lever arm of the bonding element when the add-on part is fitted are then transmitted onto the contact region of the retaining arm and the surface of the window pane substantially at right angles. As a result of the right-angled attachment to the bonding region, the induced assembly forces lead to no or only a small peel stress on the adhesive tape or layer of adhesive.

The bonding region of the window pane seal is advantageously arranged approximately in the middle of the retaining arm. The assembly forces which occur during fitting and are introduced into the bonding region via the bonding element can advantageously be transmitted and distributed uniformly by the retaining arm onto the contact region to the surface of the window pane.

The bonding element of the window pane seal is advantageously substantially L-shaped in cross section. On the one hand, this geometry enables right-angled attachment to the retaining arm and, on the other, the shortest connection to the latching profile. As an alternative to this, it can be advantageous that the bonding element has a substantially curved form, which by adjusting its geometry, the spring stiffness of the bonding element and therefore likewise the assembly force can be adjusted.

In cross section, the edges of the sub-regions of the profile arm which face one another can advantageously have a mutually complimentary contour. The complimentary contours preferably interlock with one another so that a buckling and/or sliding against one another of the two sub-regions of the profile arm due to the compressive loading on the two sub-regions which occurs during removal is reliably prevented. In addition, the removal force is uniformly and safely transmitted into the window pane.

The discontinuity in the first profile arm which faces the retaining arm can have a slotted form.

A material which is more elastic than that of the retaining profile can be arranged within the discontinuity of the profile arm. The material in the discontinuity, which is more elastic than the material of the retaining profile, enables the latching lever arm of the bonding element to continue to deflect on account of its greater flexibility. Advantageously, this also guarantees a sealing of the hollow space enclosed by the divided profile arm, the bonding element and the retaining arm. Advantageously, the assembly force can also be set up and adjusted by means of the elasticity of the chosen material in the filled discontinuity. Preferably, the material in the filled discontinuity can be a foam material, such as a foam rubber for example, or further preferably a material with a high elasticity.

At least one supporting element, which likewise has a discontinuity, can be arranged between the latching profile and the bonding region. The supporting element and the profile arm can advantageously be matched to one another so that the sub-regions of the supporting element come into contact with one another before the sub-regions of the profile arm come into contact with one another. The removal force can be set by means of the distance between supporting element and bonding region in that a variation of the distance changes the latching lever arm which acts during removal. Further, advantageously, the supporting element and the profile arm can be matched to one another in such a way that the respective sub-regions rest in contact with one another simultaneously so that the removal forces which occur are uniformly absorbed by the profile arm and supporting element and are transmitted into the window pane. At the same time, it can also be of further advantage not to provide a single supporting element but a plurality of supporting elements.

An advantageous improvement of the invention provides that the first profile arm be completely dispensed with and the forces which occur during removal be absorbed solely via supporting elements. In this case, the latching profile has only a single profile arm.

The window pane seal can advantageously have a profile element which attaches to the retaining profile and seals the region between window pane and add-on part. Preferably, the profile element can be formed in one piece on the retaining profile and further preferably have an end section made from a material which is more flexible than the material of the retaining profile. The profile element and/or the end section advantageously has an end which is flush with the outer surfaces of the add-on part and the window pane.

The profile element and/or the retaining profile of the window pane seal can have at least one core made of a stiffer material and a comparatively more flexible plastic sleeve. The plastic sleeve can be applied to the core by means of extrusion or injection molding. The core can be made up of at least two individual parts. More complex geometries can be produced by combining a plurality of simple geometries. Advantageously, the core is made of a metal material, preferably an aluminum alloy or non-rusting stainless steel or titanium or a titanium alloy or spring steel or construction steel. The assembly force can likewise be influenced by the choice of metal material and by the material thickness of the core, and the removal force by the resulting stiffness of the whole retaining profile or sub-regions of the retaining profile. It can also be of advantage to adjust the stiffness of the retaining profile by means of additional recesses in the curved regions of the core of the retaining profile which extend in the longitudinal direction of the profile body.

An arrangement with a window pane seal as claimed in one of claims 13 to 15 is also subject of the invention.

BRIEF DESCRIPTION OF THE DRAWING(S)

The invention is explained below with reference to a drawing which shows just one exemplary embodiment. In the drawing:

FIG. 1 a cross section through a window pane seal according to the invention

Figure 2:
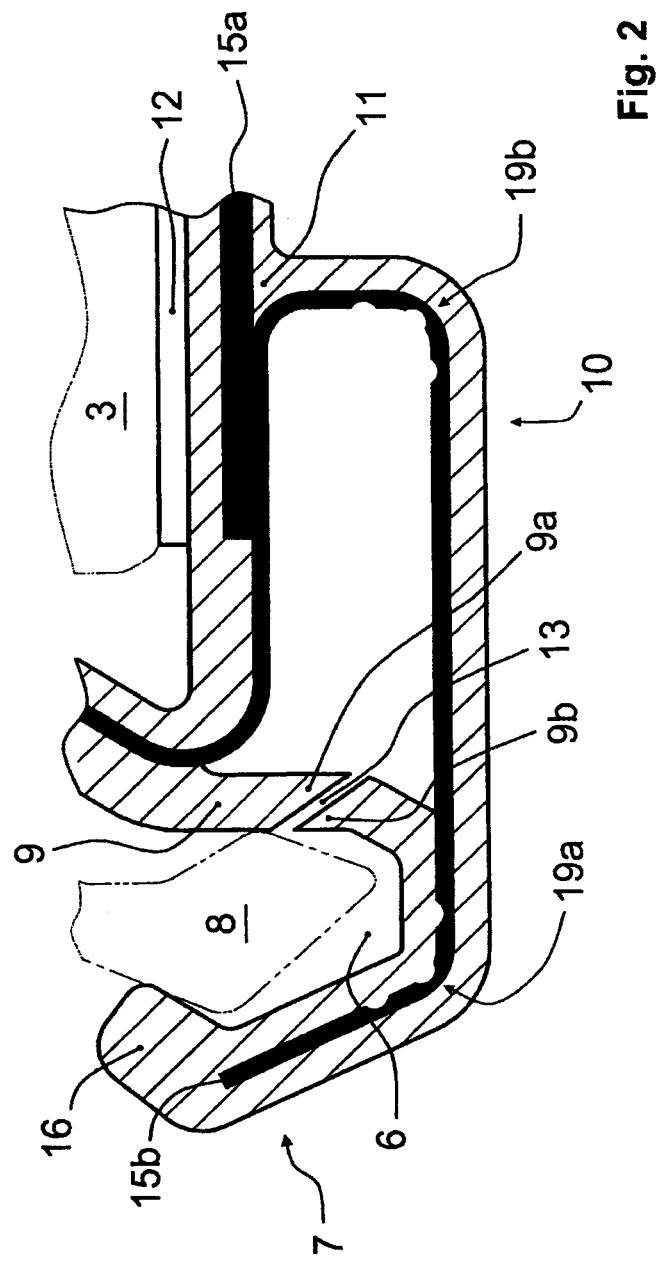
Figure 3:
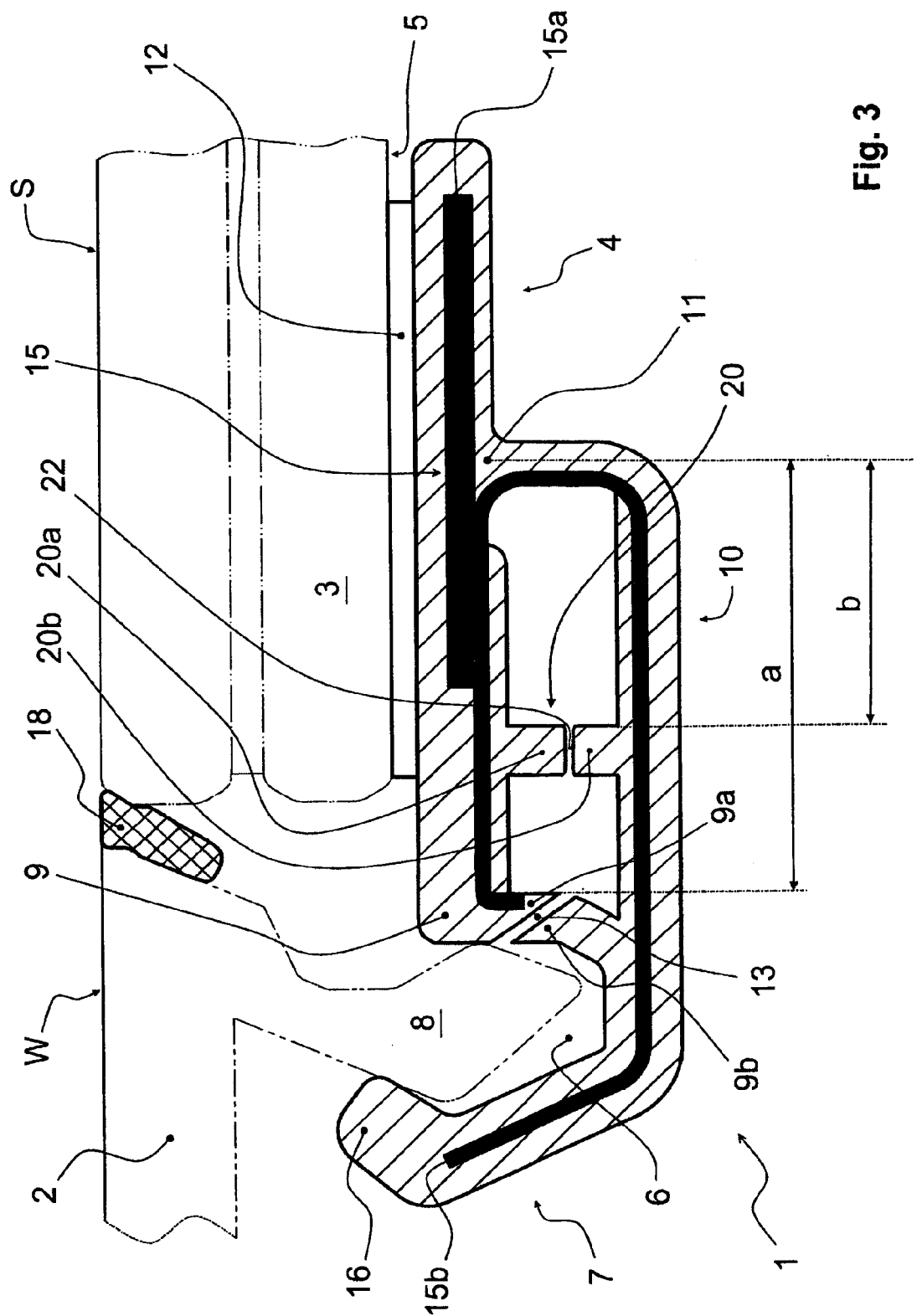
Figure 5:
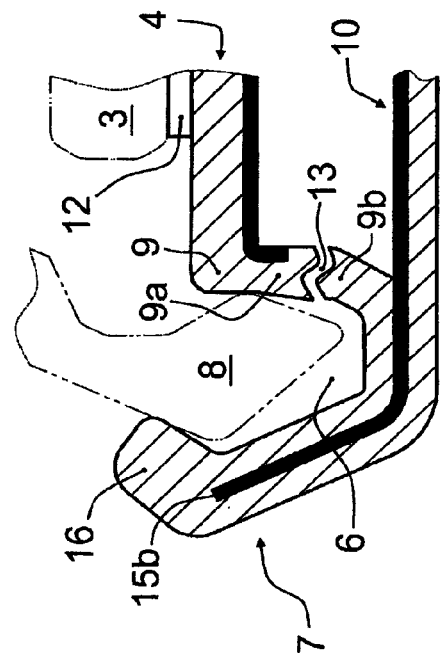
Figure 7:
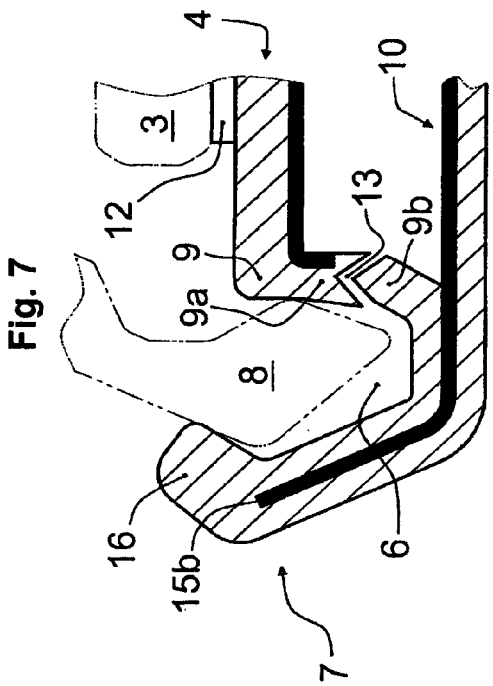
Figure 4:
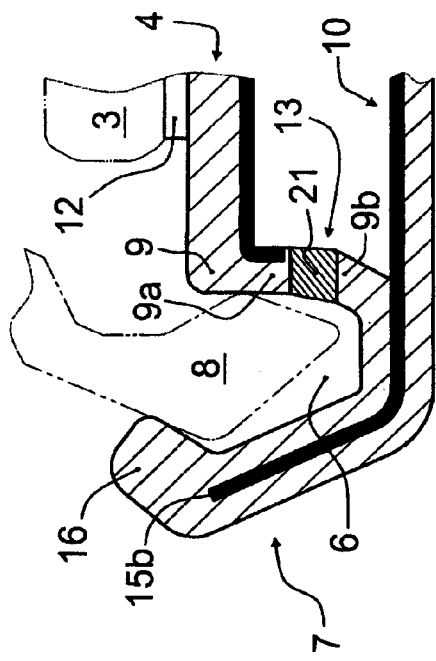
Figure 6:
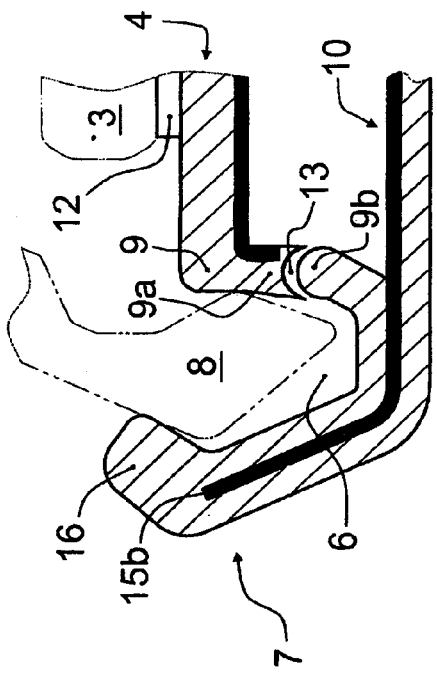
Figure 8:
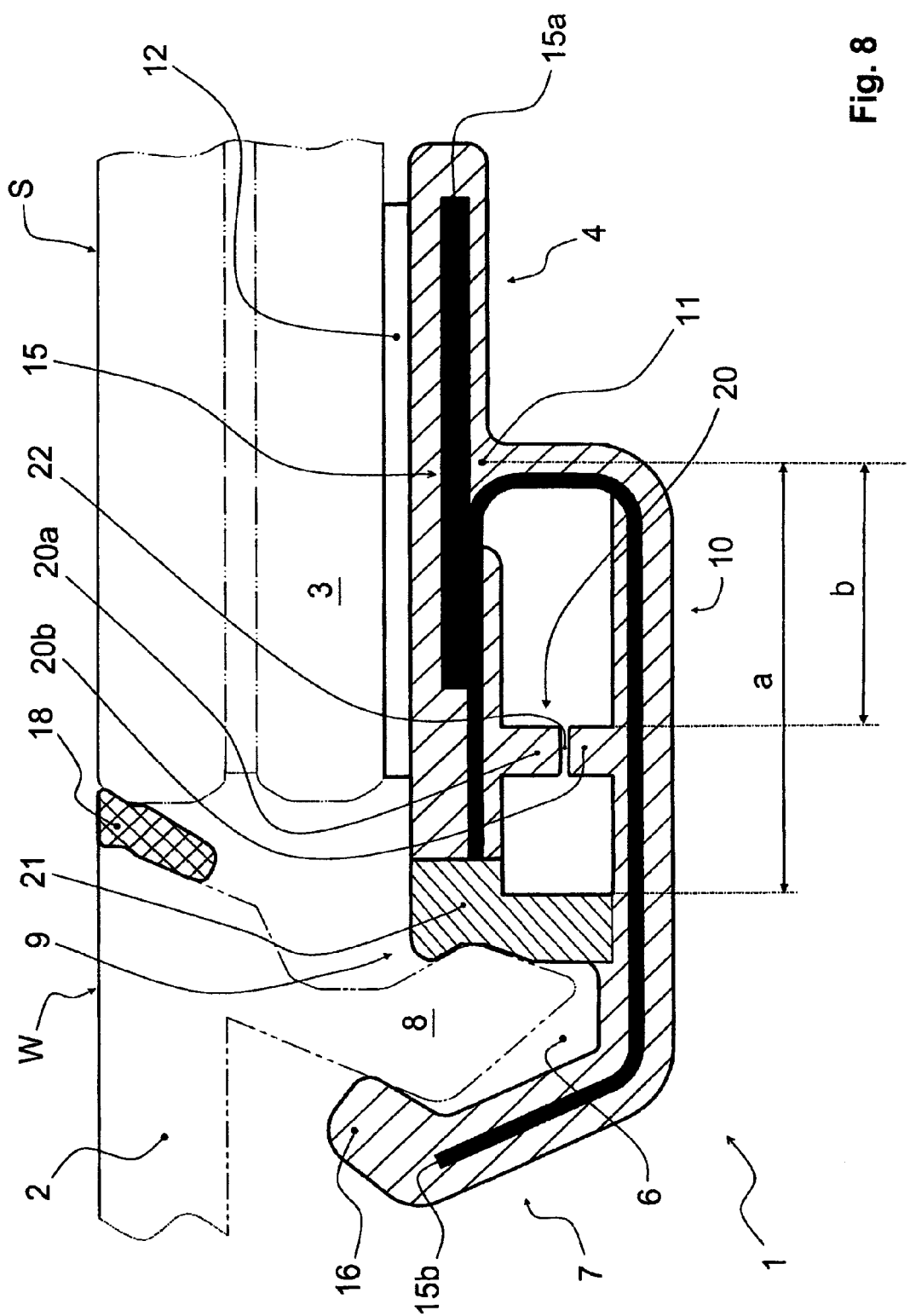
Figure 9:
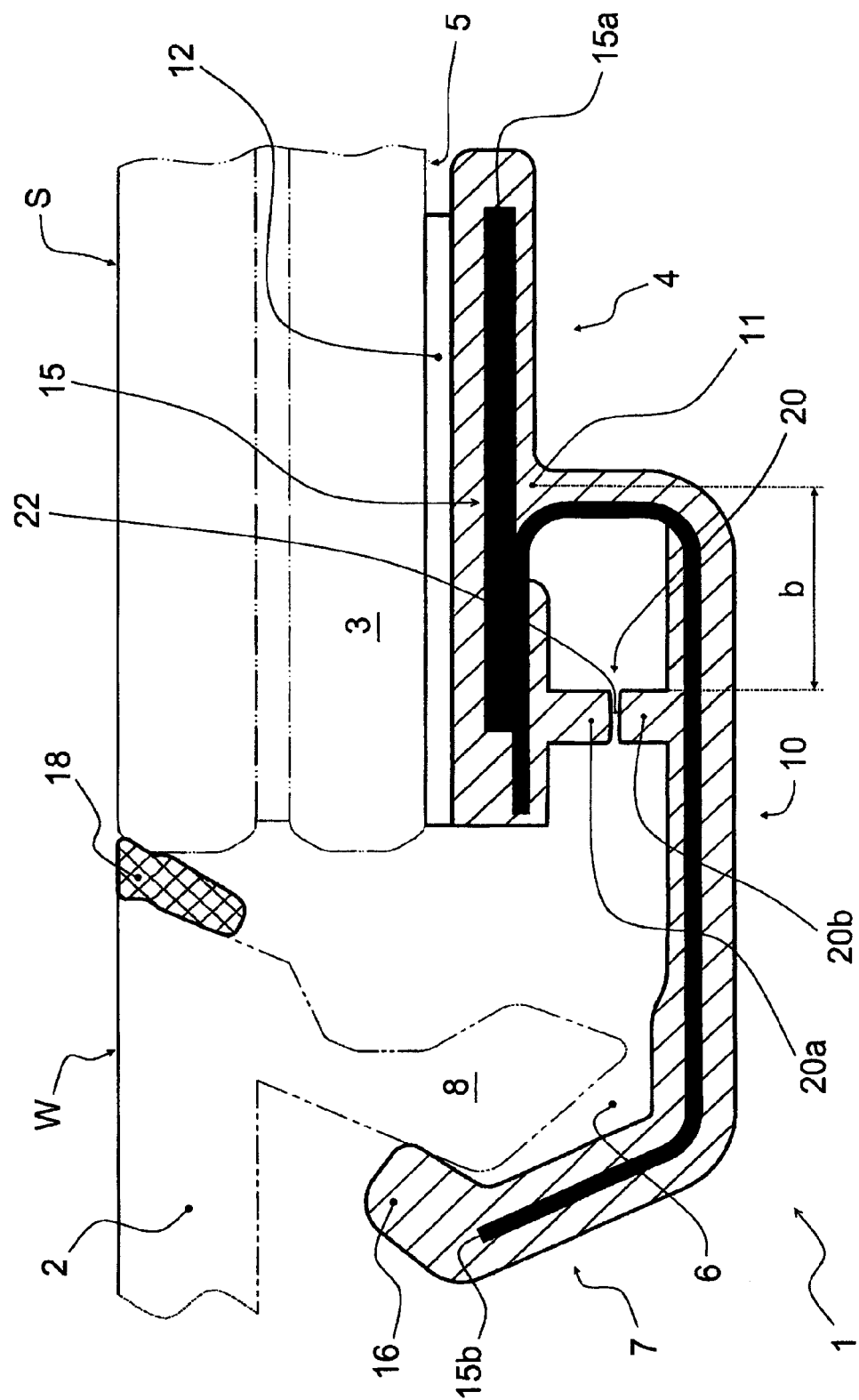

FIG. 2 a cross section of further embodiment of the window pane seal shown in FIG. 1 with additional recesses in the curved region of the core of the retaining profile FIG. 3 a cross section through a further embodiment of the window pane seal with an additional supporting element FIG. 4 a cross section through a further embodiment of the window pane seal with a discontinuity of the profile arm of the retaining profile filled with an elastic material FIG. 5 a cross section through an embodiment of the mutually complimentary contour of mutually facing sub-regions of the profile arm FIG. 6 a cross section through another embodiment of the mutually complimentary contour of mutually facing sub-regions of the profile FIG. 7 a cross section through a further embodiment of the mutually complimentary contour of mutually facing sub-regions of the profile arm FIG. 8 a cross section through a further embodiment of the window pane seal with a wide discontinuity of the profile arm of the retaining profile filled with an elastic material FIG. 9 a cross section through an embodiment of the window pane seal with a single profile arm and an additional supporting element

DETAILED DESCRIPTION OF THE INVENTION

FIG. 1 shows a cross section through a window pane seal according to the invention for attaching an add-on part 2 to a window pane 3 of a motor vehicle, having a retaining profile 1 comprising a retaining arm 4 which rests in contact with the surface 5 of the window pane and a latching profile 7 for receiving an attachment element 8 of the add-on part 2.

Here, the add-on part 2 is a water collecting channel cover 2. The retaining profile 1 is designed in such a way that a smaller force is required to fit the add-on part 2 in place than to remove it. The latching profile 7 has two profile arms which form an undercut clamping channel 6. In the fitted state, the attachment element 8 engages behind the undercut clamping channel 6, as a result of which the attachment element 8 is retained in the latching profile 7. With the retaining profile 1 according to invention, a force which is an order of magnitude less than that required for removal is required for fitting the add-on part 2. The removal force corresponds to the retaining force of the attached add-on part 2. The first profile arm 9 which faces the retaining arm 4 has a discontinuity 13 which divides the first profile arm 9 into two sub-regions 9a, 9b. In addition, a bonding element 10, which bonds the latching profile 7 to a bonding region 11 of the retaining arm 4 which is at a distance a from the first profile arm, is provided. When the add-on part 2 is fitted, the distance between the top sub-region 9a and the bottom sub-region 9b increases. As the latching profile 7 transmits the assembly forces onto the bonding element 10, this acts as a latching lever arm and the assembly forces are reduced. The length of the latching lever arm respectively directly related, the assembly force can therefore advantageously be matched to the necessary requirements by adjusting the distance a. When the add-on part 2 is removed, the sub-regions 9a, 9b come closer together. When the add-on part 2 is removed, the attachment element 8, which is located in the undercut clamping channel 6, pulls up the bottom sub-region 9b which is bonded to the bonding element 10 and presses it against the opposing top sub-region 9a. The bottom sub-region 9b is then supported on the top sub-region 9a. The latching lever arm of the bonding element 10 therefore becomes shorter and is not at all effective. As a result of this, advantageously, the removal force and therefore directly related, the retaining force of the add-on part 2 assumes a significantly higher value compared with the assembly force. A bonding strip 12, which is preferably designed in the form of double-sided adhesive tape and which further preferably extends over the whole length of the retaining arm 4, is arranged on the retaining arm 4. The retaining profile 1 is permanently secured to the rear surface 5 of the window pane 3 of the motor vehicle by means of the bonding strip 12. This guarantees a simple, fast and cost-effective bonding of the retaining profile 1 to preferably the windshield 3 of the motor vehicle. The bonding element 10 attaches to the bonding region 11 substantially at right angles. The bonding region 11 is arranged approximately in the middle of the retaining arm 4.

The central arrangement and the right-angled attachment to the bonding element 10 guarantee a uniformly distributed absorption and introduction of the transmitted assembly forces and therefore a minimization of a peel stress which is negative for the adhesion of the bonding strip 12. Because of the low assembly forces and the described introduction of force into the bonding region 11, an additional support of the retaining profile 1 on a part of the vehicle body can be dispensed with. The bonding element 10 is L-shaped in cross section. The discontinuity 13 of the first profile arm 9 has a slotted form. The slotted form is preferably provided in an extrusion tool of the retaining profile 1, but can also be produced retrospectively using a cutting process, e.g. with a knife. A profile element 14, which seals the region between window pane 3 and add-on part 2, attaches to the retaining profile 1. The profile element 14 is formed in one piece on the retaining profile 1 and has an end section 17 which is made from a rubbery-elastic material which is more flexible than the material of the retaining profile 1. The end section 17 can be formed on the profile element 14 by means of coextrusion, but can also be bonded to the profile element 14 by means of an alternative joining method, e.g. by gluing or welding. The profile element 14 and the end section 17 are formed in such a way that the profile element 14 ends substantially flush both with the add-on part outer surface W of the water collecting channel cover 2 and with the window pane outer surface S of the window pane 3. The profile element 14 and the retaining profile 1 have a core 15 made of a stiff material and a comparatively more flexible plastic sleeve 16. The core 15 is made of metal material, preferably an aluminum foil. The core is made up of two individual parts 15a, 15b which have different material thicknesses. A first aluminum profile 15a with a material thickness of preferably approx. 0.4 mm is provided in the region of the retaining arm 4. The region of the latching profile 7, the bonding element 10 and the profile element 14 has a second aluminum profile 15b with a material thickness of preferably approx. 0.2 mm. The aluminum profiles 15a, 15b are coated with a bonding agent and are fixed in position with respect to one another by extruding-on the plastic sleeve 16. The two aluminum profiles 15a, 15b can also be bonded directly to one another, e.g. by gluing, welding or soldering. Advantageously, the assembly force of the add-on part 2 can likewise be adjusted by the choice of material and the material thickness of the core 15 of the retaining profile 1.

The retaining profile 1 and/or the plastic sleeve 16 is preferably made of one or more plastics each of suitable hardness, for example polypropylene (PP), polyvinyl chloride (PVC), acrylonitrile butadiene styrene (ABS), thermoplastic elastomers (TPE) or similar and/or combinations thereof.

FIG. 2 shows a cross section of a further embodiment of the window pane seal shown in FIG. 1. Additional recesses 19a, 19b, which extend in the longitudinal direction of the retaining profile 1 and by means of whose distribution, number and notch radius the stiffness of the bonding element 10 can be adjusted, are located in the curved regions of the core 15b of the bonding element 10.

In FIG. 3, an additional supporting element 20 is provided, said supporting element is arranged between the retaining profile 7 and the bonding region 11 and likewise has a discontinuity 22. The supporting element 20 is at a distance b from the bonding region 11. The distance between the sub-regions of the supporting element 20a, 20b likewise increases when the add-on part 2 is fitted. The supporting element 20 and the discontinuous first profile arm 9 can advantageously be matched to one another so that the sub-regions 20a, 20b of the supporting element come into contact with one another before the sub-regions 9a, 9b of the profile arm 9 come into contact with one another when the add-on part is removed. The removal force can then advantageously be adjusted by means of the distance b by varying the latching lever arm which acts during removal compared with the arrangement in FIG. 1. Advantageously, the supporting element 20 and the profile arm 9 can also be matched to one another so that the respective sub-regions 9a, 9b, 20a, 20b come into contact with one another simultaneously in order to uniformly absorb the removal forces which occur and transmit them into the window pane 3. For this purpose, it can be of advantage not to provide a single supporting element 20 but a plurality of supporting elements 20. Furthermore, a sealing element 18, which ends substantially flush with and/or seals the add-on part outer surface W of the water collecting channel cover 2 with the window pane outer surface S of the window pane 3, is arranged on the water collecting channel cover 2. The sealing element 18 can be formed on the water collecting channel cover 2 using the injection molding method, but can also be glued on or welded. The sealing element 18 is preferably made of a thermoplastic elastomer (TPE), a foam rubber or some other suitable material.

FIG. 4 shows a cross section through a further embodiment of the window pane seal with a discontinuity 13 of the profile arm 9 of the retaining profile 1 filled with a more elastic material than that of the retaining profile. The elastic material forms an expansion element 21, which is preferably bonded by fusion to the sub-regions 9a, 9b of the profile arm 9. The expansion element 21 is advantageously inserted in the discontinuity 13 of the profile arm 9 by means of coextrusion, but can also be glued in or welded, for example. The material of the expansion element 21, which is more elastic than the material of the retaining profile 1, enables the bonding element 10 to continue to deflect due to the greater flexibility and, associated with this, the assembly force to be reduced by means of the available latching lever arm. Advantageously, this also guarantees a sealing of the hollow space enclosed by the profile arm 9, the bonding element 10 and the retaining arm 4. Advantageously, the assembly force can also be objectively adjusted particularly by means of the chosen elasticity of the material of the expansion element 21. The material of the expansion element 21 can be a foam material or further preferably a material with a high elasticity.

FIGS. 5 to 7 each show a cross section through an embodiment in which the sub-regions 9a, 9b of the profile arm 9 each have a mutually complimentary contour. Preferred embodiments of these complimentary contours are shown in FIGS. 5 to 7. The complimentary contours preferably interlock with one another so that a buckling and/or sliding against one another of the two sub-regions 9a, 9b of the first profile arm 9 due to the compressive loading on the sub-regions 9a, 9b which occurs during removal is prevented. In addition, the removal force is transmitted uniformly and safely from the bottom sub-region 9b to the top sub-region 9a. In addition, it can be advantageous that the supporting element sub-regions 20a, 20b of the supporting element 20 described in FIG. 3 have corresponding contours which are mutually complementary in cross section.

FIG. 8 shows a cross section through a further embodiment of the window pane seal with a discontinuity 13, which in this case is very wide, of the profile arm 9 of the retaining profile 1 filled with an elastic material. The material, which is more elastic than the material of the retaining profile 1, in turn forms an expansion element 21. The expansion element 21 is advantageously introduced into the discontinuity 13 of the profile arm 9 by means of coextrusion, but can also be glued in or welded, for example.

The material of the expansion element 21, which is more elastic than the material of the retaining profile 1, enables the bonding element 10 to continue to deflect due to the greater flexibility and, associated with this, the assembly force to be reduced. Preferably, the material of the expansion element can be a foam material or further preferably a material with a high elasticity. Advantageously, the expansion element 21 matches the external contour of the attachment element 8. In this way, as well as a sealing of the clamping channel 6, an additional fixing of the attachment element 8 in the clamping channel 6 can also be achieved. Between the expansion element 21 and the bonding region 11, the retaining profile 1 in turn has a supporting element 20 which has a discontinuity 22. Advantageously, the removal force can be adjusted by means of the distance b by modifying the latching lever arm which acts during removal compared with the arrangement in FIG. 1. According to the invention, the removal force increases in comparison with the assembly force due to the shortening of the latching lever arm of the bonding element 10 as soon as the sub-regions 20a, 20b of the supporting element come into contact with one another.

FIG. 9 shows a cross section through an embodiment of the window pane seal with a single profile arm and an additional supporting element 20. The window pane seal 1 does not have a first profile arm 9. The effective lever arm of the bonding element 10 is shortened during removal by means of the supporting element 20 which is arranged between the second profile arm, which simultaneously forms the latching profile 7, and the bonding region 11.

The invention claimed is:

1. A window pane seal for attaching an add-on part to a window pane of a motor vehicle, having a retaining profile comprising
    a retaining arm which rests in contact with the surface of the window pane and
    a latching profile for receiving an attachment element of the add-on part,
wherein the latching profile has at least two profile arms which together form an undercut clamping channel, wherein a first profile arm facing the retaining arm has a discontinuity which divides the first profile arm into two sub-regions, and wherein an additional bonding element which bonds the latching profile to a bonding region of the retaining arm which is at a distance from the first profile arm is provided, so that, when the add-on part is fit, the sub-regions move away from each other, and when the add-on part is removed, the sub-regions move towards each other, so that a smaller force is required to fit the add-on part than to remove it.

2. The window pane seal as claimed in claim 1, wherein the retaining arm has an adhesive tape bordering the surface of the window pane or a layer of adhesive bordering the surface of the window pane.

3. A window pane seal for attaching an add-on part to a window pane of a motor vehicle, having a retaining profile comprising
    a retaining arm which rests in contact with the surface of the window pane and
    a latching profile for receiving an attachment element of the add-on part, wherein the retaining profile is designed in such a way that a smaller force is required to fit the add-on part than to remove it, and wherein the bonding element attaches to the bonding region substantially at right angles.

4. A window pane seal for attaching an add-on part to a window pane of a motor vehicle, having a retaining profile comprising
    a retaining arm which rests in contact with the surface of the window pane and
    a latching profile for receiving an attachment element of the add-on part,
wherein the retaining profile is designed in such a way that a smaller force is required to fit the add-on part than to remove it, and wherein the bonding region is arranged approximately in the middle of the retaining arm.

5. A window pane seal for attaching an add-on part to a window pane of a motor vehicle, having a retaining profile comprising
    a retaining arm which rests in contact with the surface of the window pane and
    a latching profile for receiving an attachment element of the add-on part,
wherein the retaining profile is designed in such a way that a smaller force is required to fit the add-on part than to remove it, and wherein the bonding element is substantially L-shaped in cross section.

6. A window pane seal for attaching an add-on part to a window pane of a motor vehicle, having a retaining profile comprising
    a retaining arm which rests in contact with the surface of the window pane and
    a latching profile for receiving an attachment element of the add-on part, wherein the retaining profile is designed in such a way that a smaller force is required to fit the add-on part than to remove it, and wherein in cross section, the edges of the sub-regions which face one another have a mutually complimentary contour.

7. A window pane seal for attaching an add-on part to a window pane of a motor vehicle, having a retaining profile comprising
 a retaining arm which rests in contact with the surface of the window pane and
 a latching profile for receiving an attachment element of the add-on part,
wherein the retaining profile is designed in such a way that a smaller force is required to fit the add-on part than to remove it, and wherein the discontinuity has a slotted form.

8. A window pane seal for attaching an add-on part to a window pane of a motor vehicle, having a retaining profile comprising
 a retaining arm which rests in contact with the surface of the window pane and
 a latching profile for receiving an attachment element of the add-on part,
wherein the retaining profile is designed in such a way that a smaller force is required to fit the add-on part than to remove it, and wherein a material which is more elastic than that of the retaining profile is arranged within the discontinuity.

9. A window pane seal for attaching an add-on part to a window pane of a motor vehicle, having a retaining profile comprising
 a retaining arm which rests in contact with the surface of the window pane and
 a latching profile for receiving an attachment element of the add-on part,
wherein the retaining profile is designed in such a way that a smaller force is required to fit the add-on part than to remove it, and wherein at least one supporting element, which has a discontinuity, is arranged between the latching profile and the bonding region.

10. The window pane seal as claimed in claim 1, wherein a profile element, which seals the region between window pane and add-on part, attaches to the retaining profile.

11. The window pane seal as claimed in claim 1, wherein the profile element and/or the retaining profile has at least one core made of a stiff material and a comparatively more flexible plastic sleeve.

12. An arrangement having a window pane seal as claimed in claim 1 and a window pane of a motor vehicle.

13. An arrangement having a window pane seal as claimed in claim 1 and an add-on part.

14. The arrangement as claimed in claim 13, wherein the add-on part is designed in the form of a water collecting channel cover.

15. A window pane seal for attaching an add-on part to a window pane of a motor vehicle, having a retaining profile comprising
 a retaining arm which rests in contact with the surface of the window pane and
 a latching profile for receiving an attachment element of the add-on part,
wherein the retaining profile is designed in such a way that a smaller force is required to fit the add-on part than to remove it, and wherein the retaining arm has an adhesive tape bordering the surface of the window pane or a layer of adhesive bordering the surface of the window pane.

16. A window pane seal for attaching an add-on part to a window pane of a motor vehicle, having a retaining profile comprising
 a retaining arm which rests in contact with the surface of the window pane and
 a latching profile for receiving an attachment element of the add-on part,
wherein the retaining profile is designed in such a way that a smaller force is required to fit the add-on part than to remove it, and wherein the bonding element attaches to the bonding region substantially at right angles.

17. A window pane seal for attaching an add-on part to a window pane of a motor vehicle, having a retaining profile comprising
 a retaining arm which rests in contact with the surface of the window pane and
 a latching profile for receiving an attachment element of the add-on part,
wherein the retaining profile is designed in such a way that a smaller force is required to fit the add-on part than to remove it, wherein the retaining arm has an adhesive tape bordering the surface of the window pane or a layer of adhesive bordering the surface of the window pane, and wherein the bonding element attaches to the bonding region substantially at right angles.

18. The window pane seal as claimed in claim 1, wherein the bonding region is arranged approximately in the middle of the retaining arm.

19. A window pane seal for attaching an add-on part to a window pane of a motor vehicle, having a retaining profile comprising
 a retaining arm which rests in contact with the surface of the window pane and
 a latching profile for receiving an attachment element of the add-on part,
wherein the retaining profile is designed in such a way that a smaller force is required to fit the add-on part than to remove it, wherein the retaining arm has an adhesive tape bordering the surface of the window pane or a layer of adhesive bordering the surface of the window pane, and wherein the bonding region is arranged approximately in the middle of the retaining arm.

* * * * *